US012572641B2

(12) United States Patent (10) Patent No.: US 12,572,641 B2
Teglia et al. (45) Date of Patent: Mar. 10, 2026

(54) AUTHENTICATION METHOD AND ENTITY

(71) Applicant: THALES DIS FRANCE SAS, Meudon (FR)

(72) Inventors: Yannick Teglia, Belcodene (FR); Alexandre Berzati, Fuveau (FR); Benjamin Duval, Saint Maximin (FR)

(73) Assignee: THALES DIS FRANCE SAS, Meudon (FR)

( * ) Notice: Subject to any disclaimer, the term of this patent is extended or adjusted under 35 U.S.C. 154(b) by 168 days.

(21) Appl. No.: 18/269,033

(22) PCT Filed: Dec. 22, 2021

(86) PCT No.: PCT/EP2021/087397
§ 371 (c)(1),
(2) Date: Jun. 22, 2023

(87) PCT Pub. No.: WO2022/136601
PCT Pub. Date: Jun. 30, 2022

(65) Prior Publication Data
US 2024/0078305 A1      Mar. 7, 2024

(30) Foreign Application Priority Data

Dec. 23, 2020    (EP) ..................................... 20306692

(51) Int. Cl.
*G06F 21/00*      (2013.01)
*G06F 21/44*      (2013.01)
(52) U.S. Cl.
CPC ................................... *G06F 21/44* (2013.01)

(58) Field of Classification Search
CPC ...................................................... G06F 21/44
See application file for complete search history.

(56) References Cited

U.S. PATENT DOCUMENTS

| | | | |
|---|---|---|---|
| 2009/0083833 A1 | 3/2009 | Ziola et al. | |
| 2011/0002461 A1* | 1/2011 | Erhart ..................... | G06F 21/73 |
| | | | 340/5.83 |
| 2014/0041040 A1* | 2/2014 | Potkonjak ............... | G06F 21/64 |
| | | | 726/26 |
| 2015/0272509 A1* | 10/2015 | Kwon ....................... | G06N 7/01 |
| | | | 600/509 |
| 2019/0190291 A1* | 6/2019 | Waters ................... | B64C 11/006 |
| 2021/0250190 A1* | 8/2021 | Carboni ................ | H04W 12/06 |
| 2021/0358180 A1* | 11/2021 | Johnston ................. | G06F 17/18 |

FOREIGN PATENT DOCUMENTS

WO          2019081138 A1      5/2019

OTHER PUBLICATIONS

International Search Report (PCT/ISA/220) and Written Opinion (PCT/ISA/237) mailed on Apr. 19, 2022, by the European Patent Office as the International Searching Authority for current International Application No. PCT/EP2021/087397—[13 pages].

* cited by examiner

*Primary Examiner* — Rodman Alexander Mahmoudi

(57)                ABSTRACT

Provided is an authentication method, the method comprising sending, by an entity, to a chip, at least one request for getting data; receiving, by the entity, from the chip, data; and, authenticating, by the entity, based on the received data, a family relating to the chip. Other embodiments disclosed.

7 Claims, 2 Drawing Sheets

CHIP ⌐14          SERVER ⌐12

22

| GENERATE, USING THE CHALLENGE, A RESPONSE | ⌐24 |

26

| REPEAT AT LEAST THRESHOLD TIMES | 28 |

20

| DETERMINE A PROBABILITY DISTRIBUTION OF THE RESPONSES | 210 |

DOES MATCH A REFERENCE PROBABILITY DISTRIBUTION ?   212

NO

213

| NO CHIP FAMILY AUTHENTICATION |

YES

| AUTHENTICATE THE FAMILY OF CHIP | 214 |

AUTHENTICATION METHOD AND ENTITY

FIELD

The invention relates generally to an authentication method.

The invention also pertains to an authentication entity.

BACKGROUND

It is known to authenticate a chip with a Physically Unclonable Function (or PUF) by sending it a challenge and receiving back a corresponding response. Only if the response is a predetermined reference response, then the chip is authenticated.

However, such a prior art solution implies that all the responses are registered in a database for all the chips during the production of the chips or their personalizations, so as to authenticate the thus enrolled chips. Moreover, such a registration needs to be performed in a secure fashion using a secure environment during a time-critical step as such an operation implies an on-line real-time registration.

There is a need of a solution that allows reducing the needed time and therefore the corresponding cost to carry out such an authentication.

SUMMARY

The invention proposes a solution for satisfying the just herein above specified need by providing an authentication method.

According to the invention, the method comprises:

sending, by an entity, to a chip, at least one request for getting data;

receiving, by the entity, from the chip, data; and authenticating, by the entity, based on the received data, a family relating to the chip.

The principle of the invention consists in authenticating, by an entity, such as a server, a group or a family of N chips. N is greater than or equal to two.

There is a mapping of a N chips with one and the same family, instead of having a mapping of a chip with one authenticated chip.

Thus, there is no need of any registration of individual reference data allowing to authenticate the concerned chip.

Only one chip per family may be needed to authenticate the family of all the chips.

This reduces significantly the time needed to produce or personalize the concerned chips.

Contrary to the abovementioned prior art solution, the invention solution does not need to register one or several reference responses for each and every chip, so as to authenticate the chip.

Contrary to the abovementioned prior art solution, the invention solution allows reducing the time and the corresponding cost for manufacturing or personalizing the chips of a given family.

According to an additional aspect, the invention is an authentication entity.

According to the invention, the entity is configured to:

send, to a chip, at least one request for getting data;

receive, from the chip, data; and authenticate, based on the received data, a family relating to the chip.

The entity may include a local chip host device and/or a (remote) server.

BRIEF DESCRIPTION OF THE DRAWINGS

Additional features and advantages of the invention will be apparent from a detailed description of a preferred embodiment of the invention, given as an indicative and non-limitative example, in conjunction with the following drawings.

DETAILED DESCRIPTION

Herein under is considered a case in which the invention authentication method is implemented by a server, as an entity, and a chip.

The invention does not impose any constraint as to a kind of the chip type.

The chip may be included (or not) in a Secure Element (or SE).

Within the present description, an SE is a smart object that includes a chip(s) that protect(s), as a tamper resistant component(s), access to stored and/or processed data, and that is(are) intended to communicate data with an external device(s), like e.g., an SE host device.

The SE may include a chip, like e.g., a Secure Enclave, incorporated in a device, or a chip that is communicatively coupled to the device, as an SE host device, and included in a smart card (or another medium). The SE may be fixed to or removable from its host device. As removable SE, the SE may include a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device.

Naturally, the herein below described embodiment is only for exemplifying purposes and is not considered to reduce the scope of the invention.

Figures 1, 2:
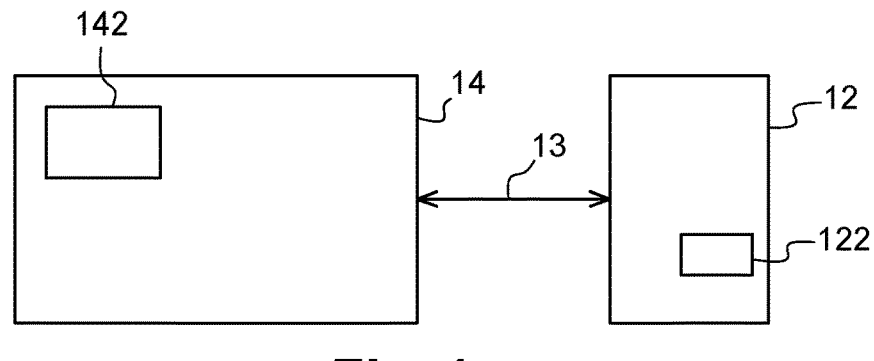
FIG. 1 is notably a simplified diagram with a server, as an entity, and a chip, the server being adapted to send, to the chip, a request for getting data, to receive, from the chip, as a request response, data, and authenticate, based on the received data, a family relating to the chip, according to the invention.
FIG. 2 is a message flow between the server and the chip of FIG. 1, so that the server determines, based on the responses, a probability distribution of the responses, and authenticates, based on the probability distribution of the responses, a family relating to the chip, according to a particular invention embodiment.

FIG. 1 shows schematically a ServeR (or SR) 12, as an entity, and a chip 14.

The SR 12 is hosted by a computer device(s) including, each, data processing means, like e.g., a controller(s), a Central Processing Unit (or CPU) and/or a processor(s) (not represented), and one or several Input/Output (or I/O) interfaces for exchanging data with outside.

The SR 12 includes (or is connected to) an SR memory(ies) 122, as data storing means.

The SR 12 is arranged to send, to the chip 14, one or several requests for getting data.

Each request includes preferably data.

The SR 12 is configured to receive, from the chip 14, data, as a request response.

The SR 12 is adapted to authenticate, based on the received data, a family relating to the chip 14.

The SR 12 is connected, through a bi-directional link 13, to the chip 14.

The chip 14 includes, as a computing device, one or several (hardware) (micro)processors, one or several (micro) controllers and/or a CPU, as data processing means, and including or being connected to I/O interfaces that are internally all connected, through an internal bidirectional data bus.

The chip 14 may include one or several memories, as data storing means.

The chip I/O interfaces may include a wired and/or a contactless interface(s), to exchange, over a ContacT (or CT) and/or ContacT-Less (or CTL) type link(s) 13, with the SR 12.

Within the present description, the adjective "CTL" denotes notably that an involved communication means communicates using one or several Short Range (or SR) type RadioFrequency (or RF) links. The SR RF may be fixed at about 13.56 Mhz.

The chip I/O interfaces may include a wireless interface(s), to exchange, over a Long Range (or LR) type RF link(s) 13, through one or several communication networks (not represented), with the SR 12. The LR RF may be fixed at several hundreds or thousands of MHz, like e.g., around 850, 900, 1800, 1900 and/or 2100 MHz.

The chip 14 is arranged to receive, from the SR 12, one or several requests for getting data.

Each request includes preferably data.

The chip 14 is arranged to send, to the SR 12, data, as a response to each request.

The chip 14 preferably includes one (or several) PUF type element(s) 142.

The PUF type element(s) allow(s) providing, based on received requests, at least part of responses.

Figure 3:
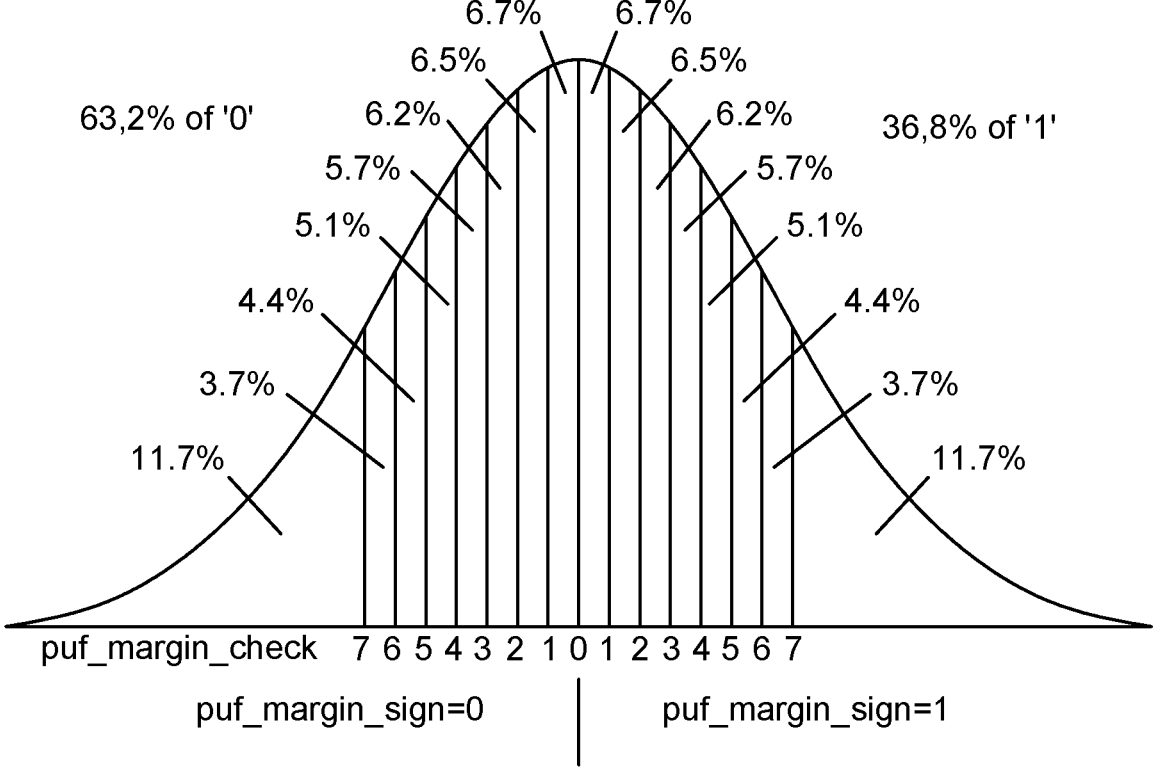
FIG. 3 represents an example of a particular reference Gaussian probability distribution of responses provided by the chip, so that the server of FIG. 2 authenticates the family relating to the chip, according to the invention embodiment.

A PUF design or implementation is described in WO 2019/081138 A1 published on May 2 2019 and entitled "Method of implementing a Physically Unclonable Function". An interesting property to exploit is a margin check that is described in this Patent document. At a glance, defining a level of margin to discriminate "0" from "1", it is possible to anticipate an amount of "0" and "1" from a PUF response. A theoretical distribution for the PUF technology is a Gaussian probability distribution where there are as many "0" and as many "1" around the mean, namely 50%. For all the PUFs following this Gaussian probability distribution, it is possible to guess probabilistically the amount of "0" with respect to the amount of "1" with regards to a predefined margin level. To illustrate the Gaussian probability distribution, it is assumed that a family of chips denoted fx is defined by a margin level of 40% with the sign 1. Such a resulting Gaussian probability distribution is represented on FIG. 3. Then, for all the chips included in the family fx, the theoretical proportion of "0" (respectively "1") as a Raw PUF Value (or RPVx) is about 63% (respectively 37%).

In order to authenticate a chip (i.e. detect that a chip belongs to a given family fx), a particular margin level has to be chosen and recorded at the SR 12 side the theoretical (or practical) amount of "1" and "0" to obtain under this parameter. The common part of RPVx becomes an identity of a family rather an identity of the chip.

Thus, only one chip 14 per family is needed to register the identity of the concerned family fx.

For instance, RPVx of chips from one and the same wafer, as a first family, may be distributed according to a first Gaussian probability distribution $N(\mu1, \sigma1)$ while, for another wafer, as a second family, the RPVy is distributed according to a first Gaussian probability distribution $N(\mu2, \sigma2)$.

Alternatively or additionally to the PUF element(s), the chip 14 includes one (or several) Random Access Memories (or RAM). The RAM(s) allow(s) providing, based on received requests, at least part of responses.

Alternatively or additionally to the PUF element(s), the chip 14 includes one (or several) flip-flop element(s). The flip-flop element(s) allow(s) providing, based on received requests, at least part of responses.

FIG. 2 shows a message flow 20 that involves the SR 12 and the chip 14, so as to authenticate the family relating to the chip 14.

It is assumed that the SR 12 has previously registered one or several reference probability distributions. Each reference Gaussian probability distribution includes e.g., a Gaussian probability distribution with a predetermined mean value μ and a predetermined standard deviation value a.

The SR 12 sends 22, to the chip 14, a request for getting a response to a challenge, the request including or being accompanied with the challenge.

The challenge (value) includes a (value) relating to one or several parameters. The parameter(s) include(s) a predetermined clock, a predetermined current and/or a predetermined voltage.

The chip 14 generates 24, using the (received) challenge, a response.

The chip 14 sends 26 to the SR 12, as a request response, the response.

These steps 22 of sending a request, 24 of generating a response and 26 of sending the response are repeated at least a predetermined threshold of times.*

The threshold includes e.g., 32.

The SR 12 determines 210, based on the responses, a probability distribution of the responses.

The SR 12 detects 212 whether the probability distribution of the responses does or does not match a predetermined reference probability distribution.

The SR 12 authenticates 214, only if the probability distribution of the responses matches the reference probability distribution, the family relating to the chip 14.

Otherwise, i.e. if the probability distribution of the responses does not match any reference probability distribution, The SR 12 does not authenticate 213 any family relating to the chip 14.

Such a chip family authentication method may be used for authenticating a wafer which the chip belongs to, a manufacturing plant that has manufactured the chip, a company which has bought the chip, a product which integrates or includes the chip and/or a country where the chip has been manufactured.

The invention solution allows authenticating a family of a chip.

The invention solution is simple and therefore cheap to implement.

The invention solution is secure.

The invention claimed is:

1. An authentication method, the method comprising:
  sending, by an entity, to a chip, at least one request for getting data;
  receiving, by the entity, from the chip, data; and
  authenticating, by the entity, based on the received data, a family relating to the chip, the method further comprising:

a) sending, by the entity, to the chip, a request for getting a response to a challenge, the request including or being accompanied with the challenge;

b) generating, by the chip, using the challenge, a response;

c) receiving, by the entity, from the chip, as a request response, the response;

d) repeating, at least a predetermined threshold of times, the steps a) of receiving a request, b) generating a response and c) sending the response;

e) determining, by the entity, based on the responses, a probability distribution of the responses;

f) detecting, by the entity, whether the probability distribution of the responses does or does not match a predetermined reference probability distribution; and g) authenticating, by the entity, if the probability distribution of the responses matches the reference probability distribution, the family relating to the chip, wherein the chip includes at least one Physically Unclonable Function, PUF, element, the at least one PUF element provides at least part of the responses.

2. The method according to claim 1, wherein the challenge includes a set of at least one value relating to at least one predetermined parameter.

3. The method according to claim 2, wherein the at least one parameter includes at least one element of a group including:

a predetermined clock;

a predetermined current;

a predetermined voltage.

4. The method according to claim 1, wherein the chip includes at least one Random Access Memory, RAM, element, the at least one RAM element provides at least part of the responses.

5. The method according to claim 1, wherein the chip includes at least one flip-flop element, the at least one flip-flop element provides at least part of the responses.

6. The method according to claim 1, wherein the chip family authentication includes an authentication of at least one element of a group including:

a wafer which the chip belongs to;

a manufacturing plant that has manufactured the chip;

a company which has bought the chip;

a product which integrates the chip;

a country where the chip has been manufactured.

7. An authentication entity, the entity is configured to:

send, to a chip, at least one request for getting data;

receive, from the chip, data; and authenticate, based on the received data, a family relating to the chip, the entity further comprised to:

a) sending, by the entity, to the chip, a request for getting a response to a challenge, the request including or being accompanied with the challenge;

b) generating, by the chip, using the challenge, a response;

c) receiving, by the entity, from the chip, as a request response, the response;

d) repeating, at least a predetermined threshold of times, the steps a) of receiving a request, b) generating a response and c) sending the response;

e) determining, by the entity, based on the responses, a probability distribution of the responses;

f) detecting, by the entity, whether the probability distribution of the responses does or does not match a predetermined reference probability distribution; and g) authenticating, by the entity, if the probability distribution of the responses matches the reference probability distribution, the family relating to the chip, wherein the chip includes at least one Physically Unclonable Function, PUF, element, the at least one PUF element provides at least part of the responses.

* * * * *